(12) United States Patent
Naito et al.

(10) Patent No.: US 11,335,546 B2
(45) Date of Patent: *May 17, 2022

(54) LASER DESORPTION/IONIZATION METHOD, MASS SPECTROMETRY METHOD, SAMPLE SUPPORT BODY, AND MANUFACTURING METHOD OF SAMPLE SUPPORT BODY

(71) Applicant: HAMAMATSU PHOTONICS K.K., Hamamatsu (JP)

(72) Inventors: Yasuhide Naito, Hamamatsu (JP); Takayuki Ohmura, Hamamatsu (JP); Masahiro Kotani, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 131 days.

This patent is subject to a terminal disclaimer.

(21) Appl. No.: 16/762,517

(22) PCT Filed: Oct. 5, 2018

(86) PCT No.: PCT/JP2018/037453
§ 371 (c)(1),
(2) Date: May 8, 2020

(87) PCT Pub. No.: WO2019/106961
PCT Pub. Date: Jun. 6, 2019

(65) Prior Publication Data
US 2020/0279729 A1     Sep. 3, 2020

(30) Foreign Application Priority Data
Nov. 28, 2017  (JP) .............................. JP2017-228147

(51) Int. Cl.
*H01J 49/00*     (2006.01)
*H01J 49/16*     (2006.01)
(Continued)

(52) U.S. Cl.
CPC ............ *H01J 49/164* (2013.01); *B01L 3/502* (2013.01); *H01J 49/0031* (2013.01); *H01J 49/0418* (2013.01); *B01L 2400/0415* (2013.01)

(58) Field of Classification Search
CPC .. H01J 49/164; H01J 49/0418; H01J 49/0031; B01L 3/502; B01L 2400/0415
See application file for complete search history.

(56) References Cited

U.S. PATENT DOCUMENTS

| 6,288,390 B1 * | 9/2001 | Siuzdak | ............. H01J 49/0418 250/288 |
| 6,617,575 B1 * | 9/2003 | Cramer | ............... H01J 49/0431 250/281 |

(Continued)

FOREIGN PATENT DOCUMENTS

| EP | 3214436 A1 | 9/2017 |
| EP | 3214437 A1 | 9/2017 |

(Continued)

OTHER PUBLICATIONS

"Refractory (disambiguation)", Wikipedia, Retrieved from the Internet: URL:https://en.wikipedia.org/w/index.php?title=Refractory_(disambiguation)&oldid=598550699 [retrieved on Jul. 16, 2021], Mar. 7, 2014, XP055825255.

(Continued)

*Primary Examiner* — Wyatt A Stoffa
(74) *Attorney, Agent, or Firm* — Faegre Drinker Biddle & Reath LLP

(57) ABSTRACT

A laser desorption/ionization method, includes: a first step of preparing a sample support body including a substrate on which a plurality of through holes opening to a first surface and a second surface facing each other are formed, a conductive layer provided on at least the first surface, and a solvent provided in the plurality of through holes with refractoriness in a vacuum; a second step of mounting a (Continued)

sample on a mounting surface of a mounting portion, and of disposing the sample support body on the sample such that the second surface is in contact with the sample; and a third step of ionizing a component of the sample that is mixed with the solvent and is moved to the first surface side from the second surface side through the through hole by irradiating the first surface with laser beam while applying a voltage to the conductive layer.

8 Claims, 9 Drawing Sheets

(51) Int. Cl.
*B01L 3/00* (2006.01)
*H01J 49/04* (2006.01)

(56) References Cited

U.S. PATENT DOCUMENTS

| | | | | |
|---|---|---|---|---|
| 7,332,271 | B2* | 2/2008 | O'Keefe | B01F 33/30351 435/6.12 |
| 7,695,978 | B2* | 4/2010 | Laprade | H01J 49/0418 250/288 |
| 8,237,114 | B2* | 8/2012 | Okuno | H01J 49/0418 250/281 |
| 9,400,267 | B2* | 7/2016 | Chen | G01N 30/724 |
| 10,486,156 | B2* | 11/2019 | Campbell | B01F 33/3031 |
| 10,600,629 | B2* | 3/2020 | Gao | H01L 21/0203 |
| 10,796,894 | B2* | 10/2020 | Trimpin | H01J 49/10 |
| 11,087,965 | B2* | 8/2021 | Kim | H01J 49/0418 |
| 2002/0094533 | A1 | 7/2002 | Hess et al. | |
| 2004/0217277 | A1 | 11/2004 | Goodley et al. | |
| 2008/0090267 | A1* | 4/2008 | Komatsu | G01N 33/5082 435/29 |
| 2010/0065735 | A1* | 3/2010 | Murakami | H01J 49/0418 250/281 |
| 2010/0261159 | A1* | 10/2010 | Hess | B01L 3/5025 435/7.1 |
| 2017/0072397 | A1* | 3/2017 | Campbell | G01N 35/00871 |
| 2017/0358436 | A1* | 12/2017 | Naito | G01N 27/62 |
| 2018/0158660 | A1* | 6/2018 | Naito | G01N 1/2806 |

FOREIGN PATENT DOCUMENTS

| | | |
|---|---|---|
| JP | H04-37542 B2 | 6/1992 |
| JP | H04-50982 B2 | 8/1992 |
| JP | 2721029 B2 | 3/1998 |
| JP | 2003-510776 A | 3/2003 |
| JP | 2009-080106 A | 4/2009 |
| JP | 5129628 B2 | 1/2013 |
| JP | 2013-520655 A | 6/2013 |
| WO | WO-01/23863 A2 | 4/2001 |
| WO | WO-2011/106198 A1 | 9/2011 |
| WO | WO-2017/038709 A1 | 3/2017 |

OTHER PUBLICATIONS

"Refractory", Wikipedia, Retrieved from the Internet: URL:https://en.wikipedia.org/w/index.php?title=Refractory&oldid=702236127 [retrieved on Jul. 16, 2021], Jan. 29, 2016, XP055825252.

International Preliminary Report on Patentability dated Jun. 11, 2020 for PCT/JP2018/037453.

* cited by examiner

LASER DESORPTION/IONIZATION METHOD, MASS SPECTROMETRY METHOD, SAMPLE SUPPORT BODY, AND MANUFACTURING METHOD OF SAMPLE SUPPORT BODY

TECHNICAL FIELD

The present disclosure relates to a laser desorption/ionization method, a mass spectrometry method, a sample support body, and a manufacturing method of a sample support body.

BACKGROUND ART

In the related art, a matrix-assisted laser desorption/ionization method (MALDI) is known as a method of ionizing a sample such as a biological sample in order to perform mass spectrometry or the like (for example, refer to Patent Literature 1). The MALDI is a method of ionizing a sample by adding a low-molecular-weight organic compound referred to as a matrix that absorbs laser beam into the sample, and by irradiating the sample with laser beam. According to such a method, it is possible to ionize a thermally unstable substance or a high-molecular-weight substance in a non-destructive manner (so-called soft ionization).

On the other hand, a surface-assisted laser desorption/ionization method (SALDI) is known as a method of performing ionization without using the matrix (for example, refer to Patent Literatures 2 and 3). The SALDI is a method of ionizing a sample by dropping the sample onto an ionization substrate having a fine concavo-convex structure on a surface, and by irradiating the sample with laser beam.

CITATION LIST

Patent Literature

Patent Literature 1: U.S. Pat. No. 7,695,978
Patent Literature 2: Japanese Patent No. 5129628
Patent Literature 3: U.S. Pat. No. 6,288,390

SUMMARY OF INVENTION

Technical Problem

In the mass spectrometry, the ionized sample is detected, and the mass spectrometry of the sample is performed on the basis of a detection result thereof. Therefore, in the mass spectrometry, it is desirable to improve a detection intensity (a sensitivity) of the ionized sample.

Therefore, an object of the present disclosure is to provide a laser desorption/ionization method, a mass spectrometry method, a sample support body, and a manufacturing method of a sample support body in which in mass spectrometry, a detection intensity of an ionized sample can be improved.

Solution to Problem

The laser desorption/ionization method of one aspect of the present disclosure, includes: a first step of preparing a sample support body including a substrate on which a plurality of through holes opening to a first surface and a second surface facing each other are formed, a conductive layer provided on at least the first surface, and a solvent provided in the plurality of through holes with refractoriness in a vacuum; a second step of mounting a sample on a mounting surface of the mounting portion, and of disposing the sample support body on the sample such that the second surface is in contact with the sample; and a third step of ionizing a component of the sample that is mixed with the solvent and is moved to the first surface side from the second surface side through the through hole by irradiating the first surface with laser beam while applying a voltage to the conductive layer, in a state in which the sample is disposed between the mounting portion and the sample support body.

In the laser desorption/ionization method, the sample support body into which the solvent is introduced into the plurality of through holes is disposed on the sample. The component of the sample is mixed with the solvent and is moved to the first surface side from the second surface side through each of the through holes. The component of the sample is remained on the first surface side, along with the solvent. Then, in a case where the first surface is irradiated with the laser beam while the voltage is applied to the conductive layer, energy is transmitted to the component of the sample that is moved to the first surface side. Accordingly, the component of the sample is ionized. In the laser desorption/ionization method, the solvent has refractoriness in a vacuum. For this reason, the solvent is more reliably remained on the first surface side, compared to a case where the solvent has volatility in a vacuum. Therefore, the component of the sample is also more reliably remained on the first surface side. Accordingly, when the first surface is irradiated with the laser beam while the voltage is applied to the conductive layer, the component of the sample is more reliably ionized. As described above, according to the laser desorption/ionization method, in mass spectrometry, it is possible to improve a detection intensity of the ionized sample.

A laser desorption/ionization method of one aspect of the present disclosure, includes: a first step of preparing a sample support body including a substrate having conductivity on which a plurality of through holes opening to a first surface and a second surface facing each other are formed, and a solvent provided in the plurality of through holes with refractoriness in a vacuum; a second step of mounting a sample on a mounting surface of a mounting portion, and of disposing the sample support body on the sample such that the second surface is in contact with the sample; and a third step of ionizing a component of the sample that is mixed with the solvent and is moved to the first surface side from the second surface side through the through hole by irradiating the first surface with laser beam while applying a voltage to the substrate, in a state in which the sample is disposed between the mounting portion and the sample support body.

According to the laser desorption/ionization method, it is possible to omit the conductive layer from the sample support body, and to obtain the same effect as that of a case where the sample support body including the conductive layer as described above is used.

In the laser desorption/ionization method of one aspect of the present disclosure, the sample may be a dry sample. In the laser desorption/ionization method, the component of the sample is mixed with the solvent and is moved, and thus, even in a case where the sample is the dry sample, it is possible to smoothly move the component of the sample.

In the laser desorption/ionization method of one aspect of the present disclosure, the solvent may be at least one selected from glycerin, diethanol amine, triethanol amine, nitrobenzyl alcohol, nitrophenyl octyl ether, thioglycerol, diethylene glycol, triethylene glycol, tetraethylene glycol, liquid paraffin, sulfolane, dithiothreitol, a mixture of dithiothreitol and thioglycerol, a mixture of dithiothreitol and nitrobenzyl alcohol, and a mixture of dithiothreitol and dithioerythritol. In this case, in the mass spectrometry, it is possible to improve the detection intensity of the ionized sample by using the sample support body in which the solvent having refractoriness in a vacuum is provided.

A mass spectrometry method of one aspect of the present disclosure, includes: each of the steps of the laser desorption/ionization method described above; and a fourth step of detecting the component that is ionized in the third step.

According to the mass spectrometry method, it is possible to improve the detection intensity of the ionized sample.

A sample support body of one aspect of the present disclosure supports a sample in a laser desorption/ionization method, and includes: a substrate on which a plurality of through holes opening to a first surface and a second surface facing each other are formed; a conductive layer provided on at least the first surface; and a solvent provided in the plurality of through holes with refractoriness in a vacuum.

According to the sample support body, as described above, in the mass spectrometry, it is possible to improve the detection intensity of the ionized sample.

In the sample support body of one aspect of the present disclosure, the substrate may be formed by performing anodic oxidation with respect to a valve metal or silicon. Accordingly, it is possible to suitably attain the movement of the component of the sample.

In the sample support body of one aspect of the present disclosure, a width of the through hole may be 1 nm to 700 nm. In this case, it is possible to more smoothly move the component of the sample. In addition, in the mass spectrometry using the laser desorption/ionization method described above, it is possible to obtain a sufficient signal intensity.

A sample support body of one aspect of the present disclosure support a sample in a laser desorption/ionization method, and includes: a substrate having conductivity on which a plurality of through holes opening to a first surface and a second surface facing each other are formed; and a solvent provided in the plurality of through holes with refractoriness in a vacuum.

According to the sample support body, it is possible to omit the conductive layer, and to obtain the same effect as that of the sample support body including the conductive layer as described above.

In the sample support body of one aspect of the present disclosure, the solvent may be at least one selected from glycerin, diethanol amine, triethanol amine, nitrobenzyl alcohol, nitrophenyl octyl ether, thioglycerol, diethylene glycol, triethylene glycol, tetraethylene glycol, liquid paraffin, sulfolane, dithiothreitol, a mixture of dithiothreitol and thioglycerol, a mixture of dithiothreitol and nitrobenzyl alcohol, and a mixture of dithiothreitol and dithioerythritol. In this case, it is possible to provide the sample support body in which the solvent having refractoriness in a vacuum is provided.

A manufacturing method of a sample support body of one aspect of the present disclosure is a method of manufacturing a sample support body supporting a sample in a laser desorption/ionization method, and includes: a first step of preparing a substrate on which a plurality of through holes opening to a first surface and a second surface facing each other are formed, and a conductive layer is provided on at least the first surface; and a second step of introducing a solvent having refractoriness in a vacuum into the plurality of through holes.

According to the manufacturing method of a sample support body, as described above, in the mass spectrometry, it is possible to manufacture the sample support body in which the detection intensity of the ionized sample can be improved.

In the manufacturing method of a sample support body of one aspect of the present disclosure, in the second step, the solvent may be dropped into the plurality of through holes from the first surface side or the second surface side. In this case, it is possible to easily introduce the solvent into each of the through holes.

In the manufacturing method of a sample support body of one aspect of the present disclosure, in the second step, the substrate may be dipped in the solvent. In this case, it is possible to easily introduce the solvent into each of the through holes.

In the manufacturing method of a sample support body of one aspect of the present disclosure, in the second step, the solvent may be introduced into the plurality of through holes in a state of being heated and evaporated. In this case, it is possible to easily introduce the solvent into each of the through holes.

A manufacturing method of a sample support body of one aspect of the present disclosure is a method of manufacturing a sample support body supporting a sample in a laser desorption/ionization method, and includes: a first step of preparing a substrate having conductivity on which a plurality of through holes opening to a first surface and a second surface facing each other are formed; and a second step of introducing a solvent having refractoriness in a vacuum into the plurality of through holes.

According to the manufacturing method of a sample support body, it is possible to manufacture the sample support body in which it the conductive layer can be omitted, and the same effect as that of the sample support body including the conductive layer as described above can be obtained.

In the manufacturing method of a sample support body of one aspect of the present disclosure, the solvent may be at least one selected from glycerin, diethanol amine, triethanol amine, nitrobenzyl alcohol, nitrophenyl octyl ether, thioglycerol, diethylene glycol, triethylene glycol, tetraethylene glycol, liquid paraffin, sulfolane, dithiothreitol, a mixture of dithiothreitol and thioglycerol, a mixture of dithiothreitol and nitrobenzyl alcohol, and a mixture of dithiothreitol and dithioerythritol. In this case, it is possible to introduce the solvent having refractoriness in a vacuum into the plurality of through holes.

Advantageous Effects of Invention

According to the present disclosure, it is possible to provide a laser desorption/ionization method, a mass spectrometry method, a sample support body, and a manufacturing method of a sample support body in which in the mass spectrometry, a detection intensity of the ionized sample can be improved.

DESCRIPTION OF EMBODIMENTS

Figure 1:
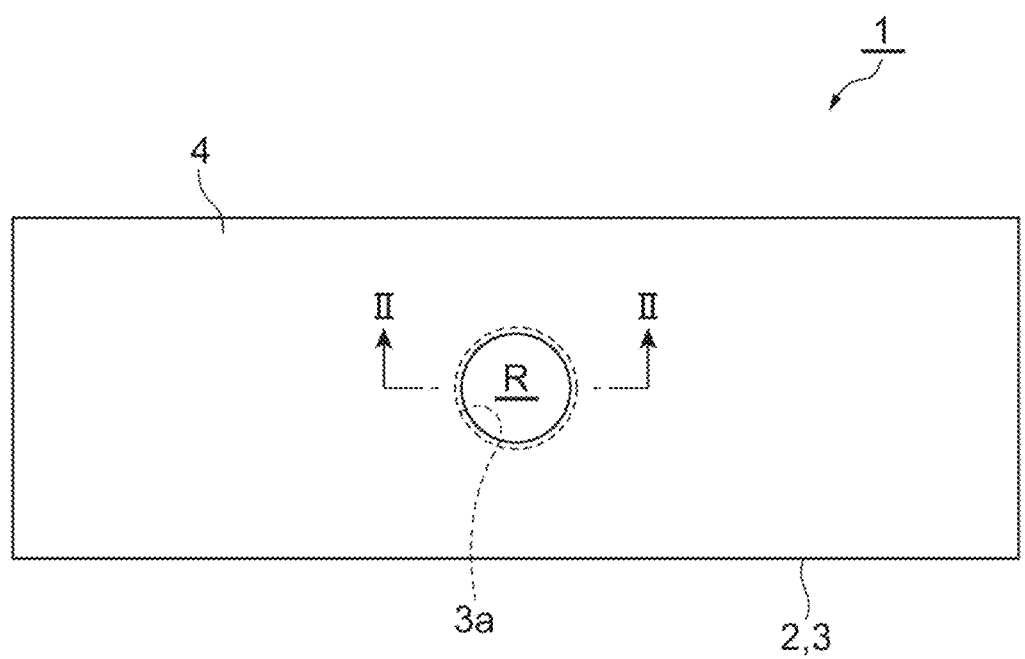
FIG. 1 is a plan view of a sample support body of one embodiment.

Hereinafter, an embodiment of the present invention will be described in detail with reference to the drawings. Note that, in each of the drawings, the same reference numerals will be applied to the same portions or the corresponding portions, and the repeated description will be omitted.

Figure 2:
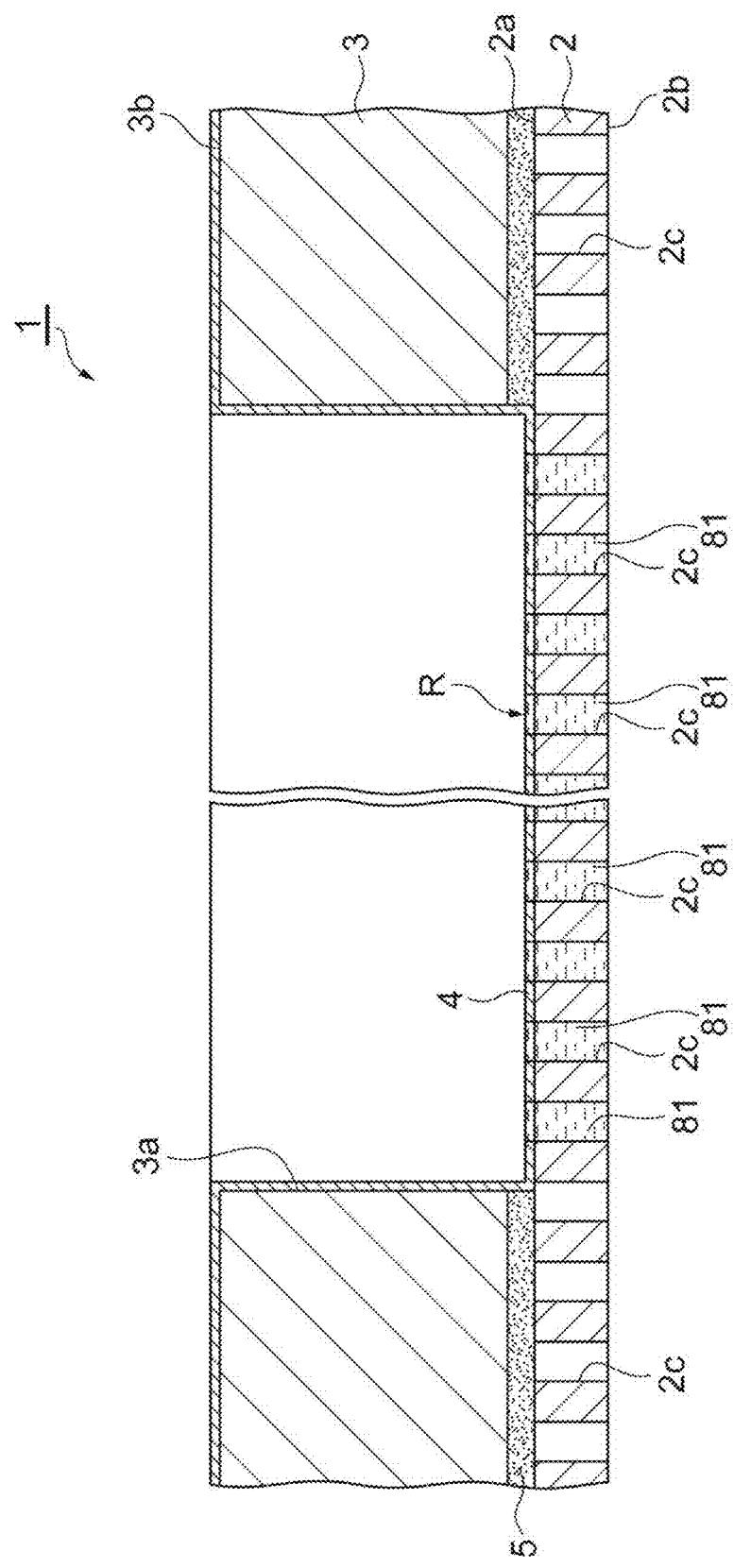
FIG. 2 is a sectional view of the sample support body along line II-II illustrated in FIG. 1.

First, a sample support body of one embodiment will be described. As illustrated in FIG. 1 and FIG. 2, a sample support body 1 includes a substrate 2, a frame 3, a conductive layer 4, and a solvent 81. The substrate 2 includes a first surface 2a and a second surface 2b facing each other. A plurality of through holes 2c are formed on the substrate 2 uniformly (with a homogeneous distribution). Each of the through holes 2c extends along a thickness direction of the substrate 2 (a direction perpendicular to the first surface 2a and the second surface 2b), and opens to the first surface 2a and the second surface 2b.

The substrate 2, for example, is formed of an insulating material into the shape of a rectangular plate. The length of one side of the substrate 2 when seen from the thickness direction of the substrate 2, for example, is approximately several cm, and the thickness of the substrate 2, for example, is approximately 1 µm to 50 µm. The through hole 2c, for example, is approximately in the shape of a circle when seen from the thickness direction of the substrate 2. The width of the through hole 2c is 1 nm to 700 nm. The width of the through hole 2c indicates the diameter of the through hole 2c in a case where the through hole 2c is approximately in the shape of a circle when seen from the thickness direction of the substrate 2, and indicates the diameter (an effective diameter) of a virtual maximum cylinder falling into the through hole 2c in a case where the through hole 2c is not approximately in the shape of a circle. A pitch between the respective through holes 2c is 1 nm to 1000 nm. In a case where the through hole 2c is approximately in the shape of a circle when seen from the thickness direction of the substrate 2, the pitch between the respective through holes 2c indicates a center-to-center distance of the respective circles, and in a case where the through hole 2c is not approximately in the shape of a circle, the pitch between the respective through holes 2c indicates a center axis-to-center axis distance of the virtual maximum cylinder falling into the through hole 2c.

The frame 3 is provided on the first surface 2a of the substrate 2. Specifically, the frame 3 is fixed to the first surface 2a of the substrate 2 by an adhesive layer 5. It is preferable that an adhesive material having less emitted gas (for example, glass with a low melting point, a vacuum adhesive agent, and the like) is used as the material of the adhesive layer 5. The frame 3 has approximately the same outer shape as that of the substrate 2 when seen from the thickness direction of the substrate 2. An opening 3a is formed in the frame 3. A portion corresponding to the opening 3a in the substrate 2 functions as an effective region R for moving a component of a sample described below to the first surface 2a side.

The frame 3, for example, is formed into the shape of a rectangular plate by the insulating material. The length of one side of the frame 3 when seen from the thickness direction of the substrate 2, for example, is approximately several cm, and the thickness of the frame 3, for example, is less than or equal to 1 mm. The opening 3a, for example, is in the shape of a circle when seen from the thickness direction of the substrate 2, and in such a case, the diameter of the opening 3a, for example, is approximately several mm to several tens of mm. By such a frame 3, the handling of the sample support body 1 is facilitated, and the deformation of the substrate 2 due to a temperature change or the like is suppressed.

The conductive layer 4 is provided on the first surface 2a of the substrate 2. Specifically, the conductive layer 4 is formed in a region corresponding to the opening 3a of the frame 3 on the first surface 2a of the substrate 2 (that is, a region corresponding to the effective region R), and is continuously (integrally) formed on an inner surface of the opening 3a, and a surface 3b of the frame 3 on a side opposite to the substrate 2. In the effective region R, the conductive layer 4 covers a portion in which the through hole 2c is not formed on the first surface 2a of the substrate 2. That is, in the effective region R, each of the through holes 2c is exposed to the opening 3a.

The conductive layer 4 is formed of a conductive material. However, it is preferable that a metal having low affinity (reactivity) with respect to a sample S and high conductivity is used as the material of the conductive layer 4, from the following reasons.

For example, in a case where the conductive layer 4 is formed of a metal such as copper (Cu) having high affinity with respect to a sample such as protein, in a process of ionizing the sample described below, the sample is ionized in a state where Cu atoms are attached to sample molecules. As a result thereof, there is a concern that a detection result is shifted in the mass spectrometry method described below as the Cu atoms are attached. Therefore, it is preferable that a metal having low affinity with respect to the sample is used as the material of the conductive layer 4.

On the other hand, a metal having high conductivity easily and stably applies a constant voltage. For this reason, in a case where the conductive layer 4 is formed of the metal having high conductivity, it is possible to homogeneously apply a voltage to the first surface 2a of the substrate 2 in the effective region R. In addition, there is a tendency that the metal having high conductivity also has high thermal conductivity. For this reason, in a case where the conductive layer 4 is formed of the metal having high conductivity, it is possible to efficiently transfer the energy of laser beam that is applied to the substrate 2 to the sample via the conductive layer 4. Therefore, it is preferable that the metal having high conductivity is used as the material of the conductive layer 4.

From the viewpoint described above, for example, it is preferable that gold (Au), platinum (Pt), and the like are used as the material of the conductive layer 4. The conductive layer 4, for example, is formed to have a thickness of approximately 1 nm to 350 nm by a plating method, an atomic layer deposition (ALD) method, a vapor deposition method, a sputtering method, and the like. Note that, for example, chromium (Cr), nickel (Ni), titanium (Ti), and the like may be used as the material of the conductive layer 4.

The solvent 81 is provided in the plurality of through holes 2c. The solvent 81 is provided in each of the through holes 2c in at least the effective region R. The solvent 81 is remained on an inner wall surface of each of the through holes 2c by a capillary action. The plurality of through holes 2c is filled with the solvent 81. The solvent 81, for example, is an organic solvent. The solvent 81 has refractoriness in a vacuum. "Having refractoriness in a vacuum" indicates having refractoriness higher than that of water in a vacuum. That is, "having refractoriness in a vacuum" indicates having less volatility than that of water in a vacuum. "Having refractoriness in a vacuum" indicates that volatility in a vacuum is lower than volatility of water in vacuum.

In the atmosphere, the volatility of the solvent 81 is lower than the volatility of water. In a vacuum, the volatility of the solvent 81 is lower than the volatility of water. In the atmosphere, the volatility of the solvent 81 is lower than the volatility of acetone. In a vacuum, the volatility of the solvent 81 is lower than the volatility of acetone. In the atmosphere, the volatility of the solvent 81 is lower than the volatility of acetonitrile. In a vacuum, the volatility of the solvent 81 is lower than the volatility of acetonitrile. In the atmosphere, the solvent 81 is in a liquid form, and has fluidity. In a vacuum, the solvent 81 is in a liquid form, and has fluidity. In the atmosphere, a surface tension of the solvent 81 is lower than a surface tension of water. In a vacuum, the surface tension of the solvent 81 is lower than the surface tension of water. The solvent 81, for example, is glycerin (glycerol).

Figure 3:
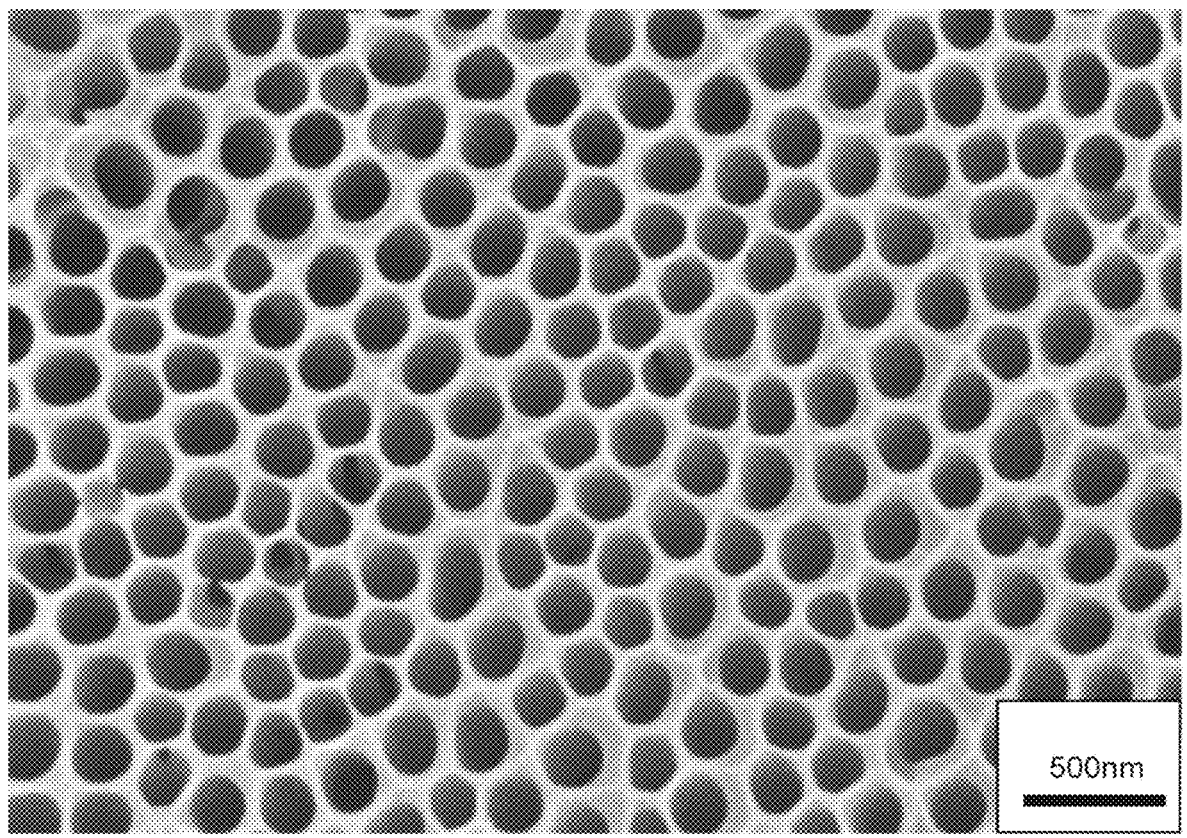
FIG. 3 is a diagram illustrating an enlarged image of a substrate of the sample support body illustrated in FIG. 1.

FIG. 3 is a diagram illustrating an enlarged image of the substrate 2 when seen from the thickness direction of the substrate 2. In FIG. 3, a black portion is the through hole 2c, and a white portion is a partition portion between the through holes 2c. As illustrated in FIG. 3, the plurality of through holes 2c having an approximately constant width are uniformly formed on the substrate 2. It is preferable that an opening rate of the through holes 2c in the effective region R (a ratio of all of the through holes 2c to the effective region R when seen from the thickness direction of the substrate 2) is practically 10% to 80%, and is particularly 60% to 80%. The sizes of the plurality of through holes 2c may be uneven with each other, and the plurality of through holes 2c may be partially connected to each other.

The substrate 2 illustrated in FIG. 3 is an alumina porous film that is formed by performing anodic oxidation with respect to aluminum (Al). Specifically, an anodic oxidation treatment is performed with respect to an Al substrate, and a surface portion that is oxidized is peeled off from the Al substrate, and thus, it is possible to obtain the substrate 2. Note that, the substrate 2 may be formed by performing anodic oxidation with respect to a valve metal other than Al, such as tantalum (Ta), niobium (Nb), titanium (Ti), hafnium (Hf), zirconium (Zr), zinc (Zn), tungsten (W), bismuth (Bi), and antimony (Sb), or may be formed by performing anodic oxidation with respect to silicon (Si).

Figure 4:
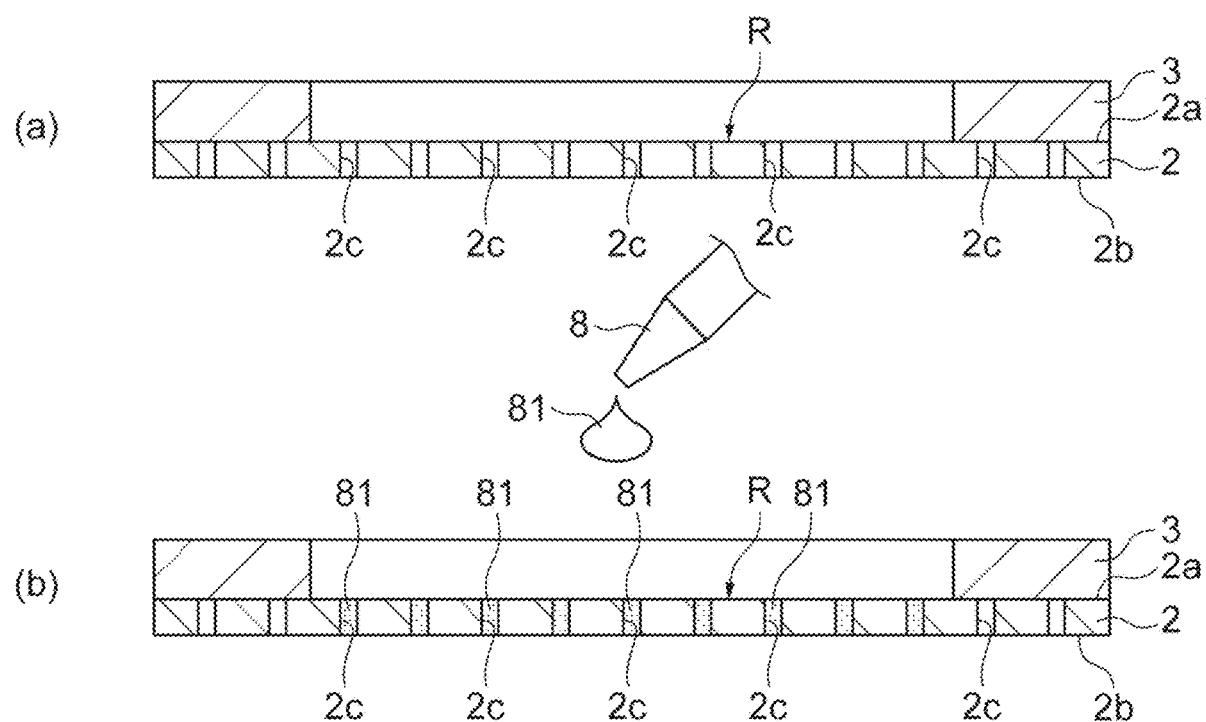
FIG. 4 is a diagram illustrating a manufacturing method of a sample support body of one embodiment.

Next, a manufacturing method of the sample support body 1 will be described. In FIG. 4, the conductive layer 4 and the adhesive layer 5 in the sample support body 1 are not illustrated. In addition, for the convenience of illustration, a dimensional ratio or the like is different between the sample support body 1 illustrated in FIG. 1 and FIG. 2 and the sample support body 1 illustrated in FIG. 4.

First, as illustrated in (a) of FIG. 4, the substrate 2 in which the conductive layer 4 is provided on the first surface 2a is prepared in a state of being fixed to the frame 3 (a first step). The substrate 2 may be prepared by being manufactured by a person who carries out the laser desorption/ionization method and the mass spectrometry method, or may be prepared by being acquired from a manufacturer, a seller, or the like of the substrate 2.

Subsequently, the solvent 81 is introduced into the plurality of through holes 2c of the substrate 2 (a second step). Specifically, as illustrated in (b) of FIG. 4, the solvent 81, for example, is dropped into the plurality of through holes 2c from the first surface 2a side of the substrate 2 by a pipette 8. The solvent 81 is dropped onto approximately the entire region of the effective region R. The solvent 81 is moved towards the second surface 2b side from the first surface 2a side of the substrate 2 through each of the through holes 2c. Each of the through holes 2c is filled with the solvent 81. The solvent 81 may be prepared by being manufactured by a person who carries out the laser desorption/ionization method and the mass spectrometry method, or may be prepared by being acquired from a manufacturer, a seller, or the like of the solvent 81.

Figure 5:
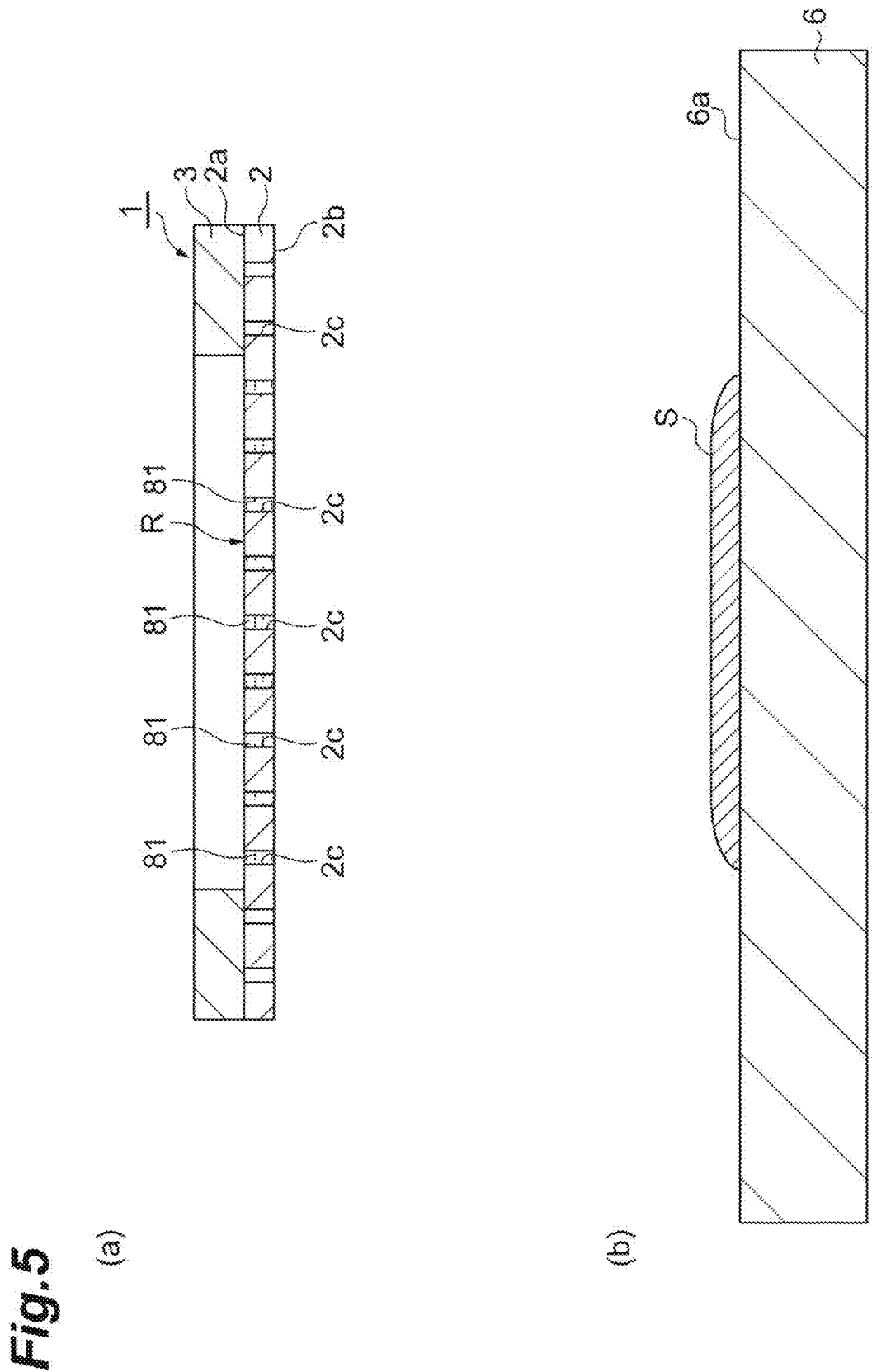
FIG. 5 is a diagram illustrating steps of a mass spectrometry method of one embodiment.
Figure 6:
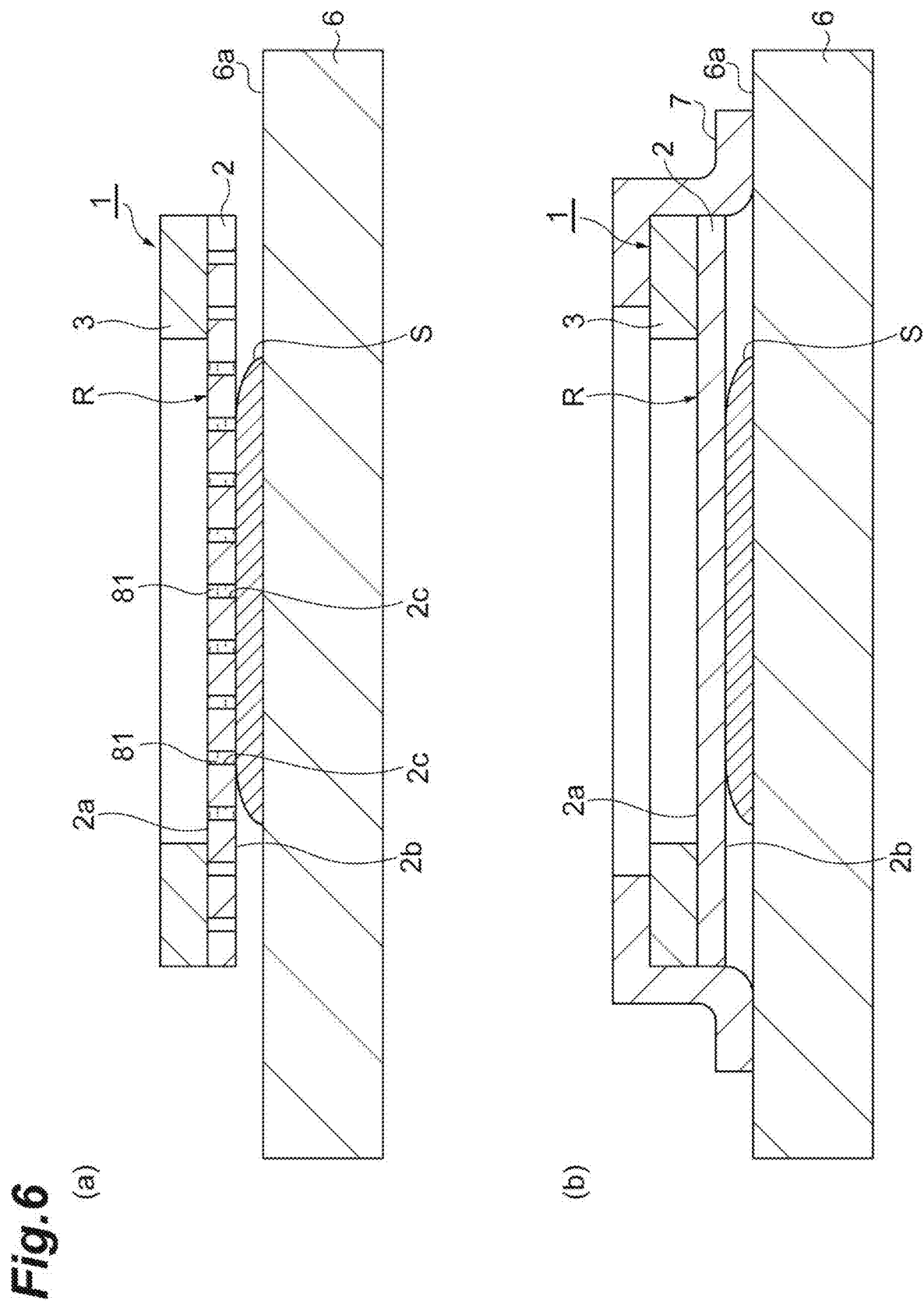
FIG. 6 is a diagram illustrating the steps of the mass spectrometry method of one embodiment.
Figure 7:
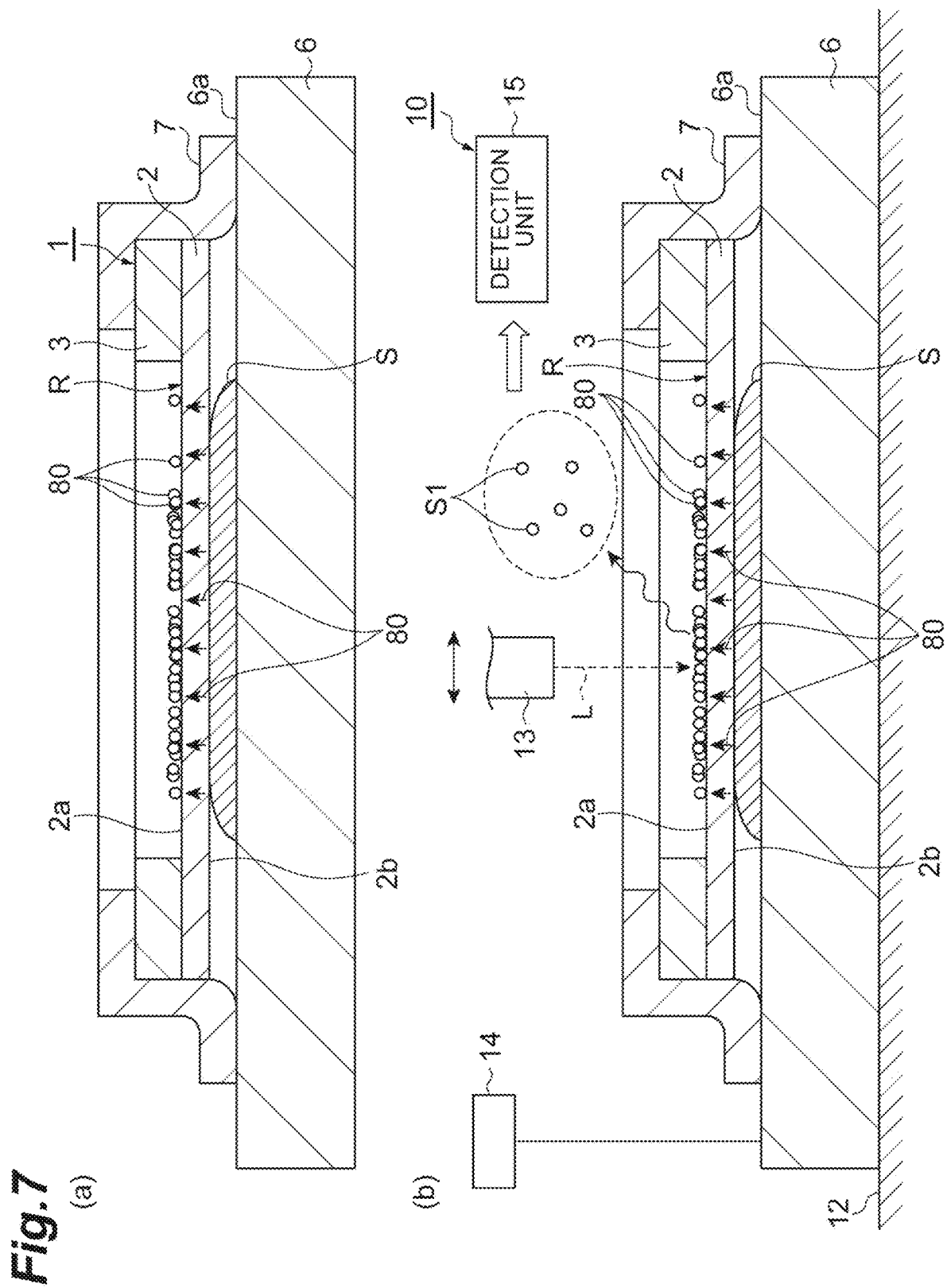
FIG. 7 is a diagram illustrating the steps of the mass spectrometry method of one embodiment.

Next, a laser desorption/ionization method and a mass spectrometry method using the sample support body 1 will be described. In FIG. 5 to FIG. 7, the conductive layer 4 and the adhesive layer 5 in the sample support body 1 are not illustrated. In addition, for the convenience of illustration, a dimensional ratio or the like is different between the sample support body 1 illustrated in FIG. 1 and FIG. 2 and the sample support body 1 illustrated in FIG. 5 to FIG. 7.

First, as illustrated in (a) of FIG. 5, the sample support body 1 described above is prepared (a first step). The sample support body 1 may be prepared by being manufactured by a person who carries out the laser desorption/ionization method and the mass spectrometry method, or may be prepared by being acquired from a manufacturer, a seller, or the like of the sample support body 1.

Subsequently, as illustrated in (b) of FIG. 5, the sample S that is a mass spectrometry target is mounted on a mounting surface 6a of a glass slide (a mounting portion) 6 (a second step). The glass slide 6 is a glass substrate on which a transparent conductive film such as an indium tin oxide (ITO) film is formed, and the surface of the transparent conductive film is the mounting surface 6a. Note that, not only the glass slide 6 but also a member that is capable of ensuring conductivity (for example, a substrate formed of a metal material such as stainless steel, or the like) can be used as the mounting portion. Subsequently, as illustrated in (a) of FIG. 6, the sample support body 1 is disposed on the sample S such that the second surface 2b is in contact with the sample S (the second step). At this time, the sample S is disposed in the effective region R when seen from the thickness direction of the substrate 2.

Here, the sample 5, for example, is a human hair. The sample S is a dry sample. In addition, in order to smoothly move a component of the sample S, a solution for decreasing the viscosity of the component of the sample S (for example, an acetonitrile mixed liquid or the like) may be mixed with the sample S. Subsequently, as illustrated in (b) of FIG. 6, the sample support body 1 is fixed to the glass slide 6 in a state where the second surface 2b of the substrate 2 is brought into contact with the sample S. At this time, the sample support body 1 is fixed to the glass slide 6 by a tape 7 having conductivity (for example, a carbon tape or the like). Specifically, the tape 7 is in contact with the conductive layer 4 on the first surface 2a of the substrate 2, and is in contact with the mounting surface 6a of the glass slide 6, and thus, the sample support body 1 is fixed to the glass slide 6. The tape 7 may be a part of the sample support body 1, or may be prepared separately from the sample support body 1. In a case where the tape 7 is a part of the sample support body 1 (that is, in a case where the sample support body 1 includes the tape 7), for example, the tape 7 may be fixed in advance to the first surface 2a side in a peripheral portion of the substrate 2. More specifically, the tape 7 may be fixed onto the conductive layer 4 in the peripheral portion of the substrate 2. Note that, in (b) of FIG. 6 and FIG. 7, the through hole 2c and the solvent 81 in the sample support body 1 are not illustrated.

As illustrated in (a) of FIG. 7, the solvent 81 in each of the through holes 2c is mixed with the sample S that is in contact with the second surface 2b of the sample support body 1 in each of the through holes 2c. The component of the sample S is mixed with the solvent 81 and is moved towards the first surface 2a side from the second surface 2b of the sample support body 1 side through each of the through holes 2c. A mixed liquid 80 of the sample S and the solvent 81 is remained on the first surface 2a side of the sample support body 1 in each of the through holes 2c by the surface tension.

Subsequently, as illustrated in (b) of FIG. 7, the glass slide 6, the sample support body 1, and the sample S are mounted on a support portion 12 (for example, a stage) of the mass spectrometry device 10, in a state where the sample S is disposed between the glass slide 6 and the sample support body 1. That is, the sample S is supported by the sample support body 1. Subsequently, an environment in which the glass slide 6, the sample support body 1, and the sample S are mounted is a vacuum state. Subsequently, a voltage is applied to the conductive layer 4 of the sample support body 1 via the mounting surface 6a of the glass slide 6 and the tape 7 by a voltage application unit 14 of the mass spectrometry device 10 (a third step). Subsequently, the first surface 2a of the substrate 2 is irradiated with laser beam L through the opening 3a of the frame 3 by a laser beam irradiation unit 13 of the mass spectrometry device 10 (the third step).

That is, the laser beam L is applied to a region corresponding to the opening 3a of the frame 3 on the first surface 2a of the substrate 2 (that is, a region corresponding to the effective region R). Here, the laser beam irradiation unit 13 is capable of scanning the region corresponding to the effective region R with the laser beam L. Note that, the scanning of the laser beam L with respect to the region corresponding to the effective region R can be performed by operating at least one of the support portion 12 and the laser beam irradiation unit 13.

As described above, the first surface 2a of the substrate 2 is irradiated with the laser beam L while a voltage is applied to the conductive layer 4. Accordingly, the component of the sample S that is moved to the first surface 2a side of the substrate 2 is ionized, and a sample ion Si (the component that is ionized) is emitted (the third step). Specifically, the conductive layer 4, and the solvent 81 that is remained on the first surface 2a side absorb the energy of the laser beam L. The solvent 81 is gasified along with the component of the sample S by the energy. Then, a proton or a cation is added to the molecules of the component of the sample S that is gasified, and thus, the sample ion S1 is obtained. The first step to the third step described above correspond to the laser desorption/ionization method using the sample support body 1.

The sample ion S1 that is emitted is moved towards a ground electrode (not illustrated) that is provided between the sample support body 1 and an ion detection unit 15 while being accelerated. That is, the sample ion S1 is moved towards the ground electrode while being accelerated by a potential difference that occurs between the conductive layer 4 to which the voltage is applied and the ground electrode. Then, the sample ion S1 is detected by the ion detection unit 15 of the mass spectrometry device 10 (a fourth step). Here, the ion detection unit 15 detects the sample ion S1 to correspond to a scanning position of the laser beam L. Accordingly, it is possible to image a two-dimensional distribution of the molecules configuring the sample S. Note that, here, the mass spectrometry device 10 is a mass spectrometry device using a time-of-flight mass spectrometry (TOF-MS) method. The first step to the fourth step described above correspond to the mass spectrometry method using the sample support body 1.

As described above, in the laser desorption/ionization method, the sample support body 1 in which the solvent 81 is provided is disposed on the sample S. The component of the sample S is mixed with the solvent 81 and is moved to the first surface 2a side from the second surface 2b side through each of the through holes 2c. The component of the sample S is remained on the first surface 2a side, along with the solvent 81. As described above, the component of the sample S is extracted to the first surface 2a side from the second surface 2b side through the plurality of through holes 2c by the solvent 81. Then, in a case where the first surface 2a is irradiated with the laser beam L while the voltage is applied to the conductive layer 4, the energy is transmitted to the component of the sample S that is moved to the first surface 2a side. Accordingly, the component of the sample S is ionized. In the laser desorption/ionization method, the solvent 81 has refractoriness in a vacuum. For this reason, the solvent 81 is more reliably remained on the first surface 2a side, compared to a case where the solvent has volatility in a vacuum. Therefore, the component of the sample S that is extracted by the solvent 81 is also more reliably remained on the first surface 2a side. That is, the solvent 81 is remained on the first surface 2a side in each of the through holes 2c for a longer period of time, and the sample S is extracted to the first surface 2a side by the solvent 81 for a longer period of time. Accordingly, when the first surface 2a is irradiated with the laser beam L while the voltage is applied to the conductive layer 4, the component of the sample S is more reliably ionized. That is, the solvent 81 and the sample S are remained on the first surface 2a side for a longer period of time, and thus, the component of the sample S can be ionized by applying the laser beam L while applying the voltage for a longer period of time. Accordingly, it is possible to ionize the components of more samples S. As described above, according to the laser desorption/ionization method, in the mass spectrometry, it is possible to improve a detection intensity of the ionized sample S. That is, when the mass spectrometry is performed with respect to the same samples, it is possible to improve the sensitivity of the mass spectrometry, compared to a case where the sample is not reliably ionized.

In addition, in the laser desorption/ionization method, the sample S is the dry sample. In the laser desorption/ionization method, the component of the sample S is mixed with the solvent 81 and is moved, and thus, even in a case where the sample S is the dry sample, it is possible to smoothly move the component of the sample S.

According to the mass spectrometry method as described above, it is possible to improve the detection intensity of the ionized sample S.

According to the sample support body 1 as described above, as described above, in the mass spectrometry, it is possible to improve the detection intensity of the ionized sample S.

In addition, in the sample support body 1, the substrate 2 is formed by performing anodic oxidation with respect to a valve metal or silicon. Accordingly, it is possible to suitably attain the movement of the component of the sample S.

In addition, in the sample support body 1, the width of the through hole 2c is 1 nm to 700 nm. In this case, it is possible to more smoothly move the component of the sample S. In addition, in the mass spectrometry using the laser desorption/ionization method described above, it is possible to obtain a sufficient signal intensity.

According to the manufacturing method of the sample support body 1 as described above, as described above, in the mass spectrometry, it is possible to manufacture the sample support body 1 in which the detection intensity of the ionized sample S can be improved.

In addition, in the manufacturing method of the sample support body 1, in the second step, the solvent 81 is dropped into the plurality of through holes 2c from the first surface 2a side. In this case, it is possible to easily introduce the solvent 81 into each of the through holes 2c.

The present disclosure is not limited to the embodiment described above. For example, the conductive layer 4 may not be provided on second surface 2b of the substrate 2 and the inner surface of the through hole 2c, insofar as the conductive layer 4 is provided on at least the first surface 2a of the substrate 2. In addition, the conductive layer 4 may be provided on the second surface 2b of the substrate 2 and the inner surface of the through hole 2c. In addition, the sample support body 1 may be fixed to the glass slide 6 by means other than the tape 7 (for example, means using an adhesive agent, a fixing tool, or the like).

In addition, in the sample support body 1, the substrate 2 may have conductivity, and in the third step of the laser desorption/ionization method and the mass spectrometry method described above, the voltage may be applied to the substrate 2. In this case, it is possible to omit the conductive layer 4 from the sample support body 1, and to obtain the same effect as that of a case where the sample support body 1 including the conductive layer 4 as described above is used.

In addition, an example has been described in which the sample S is a human hair, but the sample S may be various. In addition, an example has been described in which the sample S is the dry sample, but the sample S may be a hydrous sample.

In addition, an example has been described in which the solvent 81 is glycerin, but the solvent 81 may be a solvent having refractoriness in a vacuum. For example, the solvent 81 may be at least one selected from glycerin, diethanol amine, triethanol amine, nitrobenzyl alcohol, nitrophenyl octyl ether, thioglycerol, diethylene glycol, triethylene glycol, tetraethylene glycol, liquid paraffin, sulfolane, dithiothreitol, a mixture of dithiothreitol and thioglycerol, a mixture of dithiothreitol and nitrobenzyl alcohol, and a mixture of dithiothreitol and dithioerythritol. Even in the case of using the sample support body 1 in which such materials are provided as the solvent 81, in the mass spectrometry, it is possible to improve the detection intensity of the ionized sample S.

Figure 8:
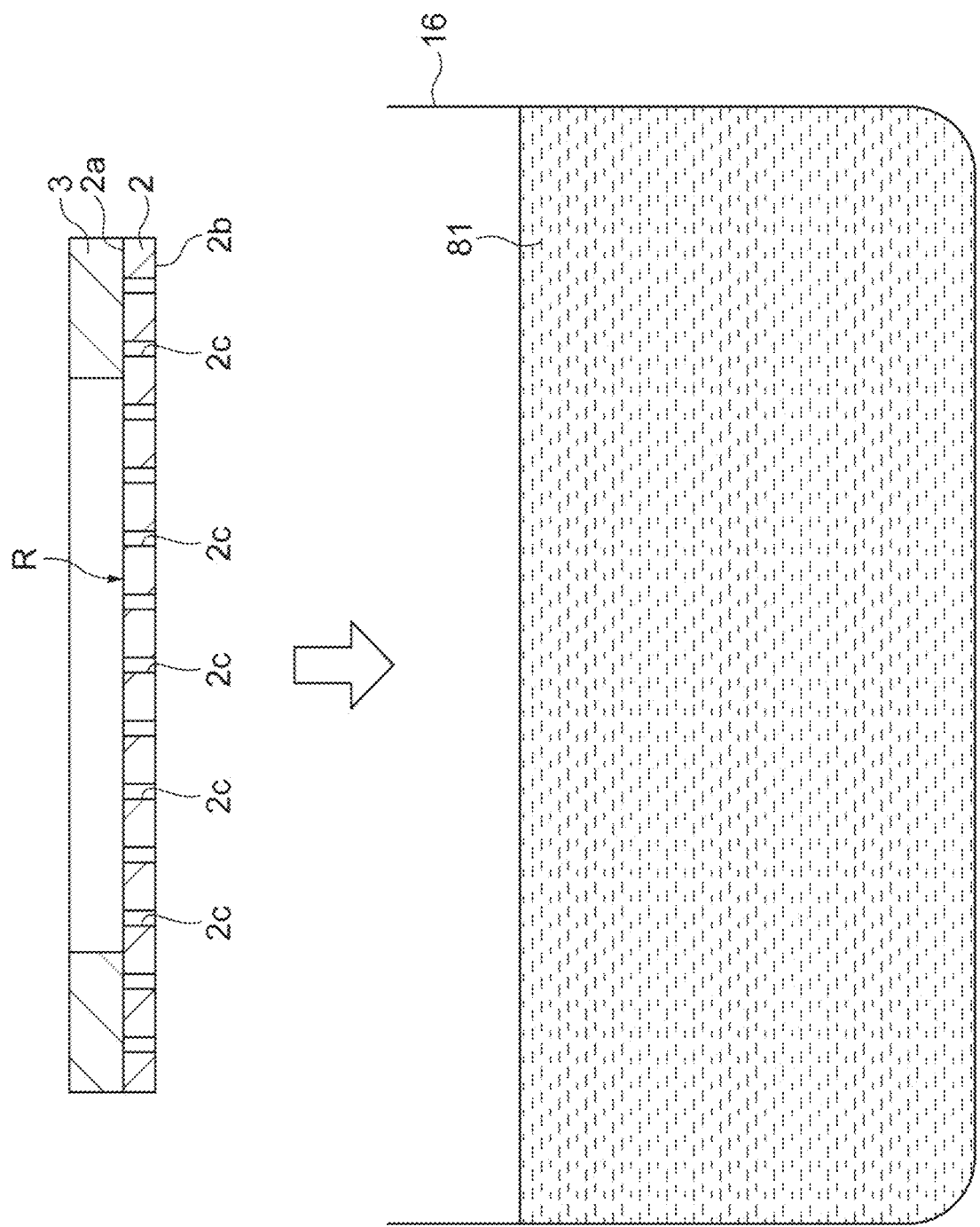
FIG. 8 is a diagram illustrating steps of a modification example of a manufacturing method of the sample support body.

In addition, in the second step of the manufacturing method of the sample support body 1 described above, an example has been described in which the solvent 81 is dropped into the plurality of through holes 2c from the first surface 2a side, but the solvent 81 may be dropped into the plurality of through holes 2c from the second surface 2b side. In addition, the solvent 81, for example, may be applied into the plurality of through holes 2c from the first surface 2a side or the second surface 2b side of the sample support body 1 with approximately a uniform amount by an airbrush or the like. In addition, as illustrated in FIG. 8, in the second step of the manufacturing method of the sample support body 1, the substrate 2 on which the conductive layer 4 is provided, for example, may be dipped in the solvent 81 that is contained in a container 16, in a state of being fixed to the frame 3. In any case, it is possible to easily introduce the solvent 81 into each of the through holes 2c.

Figure 9:
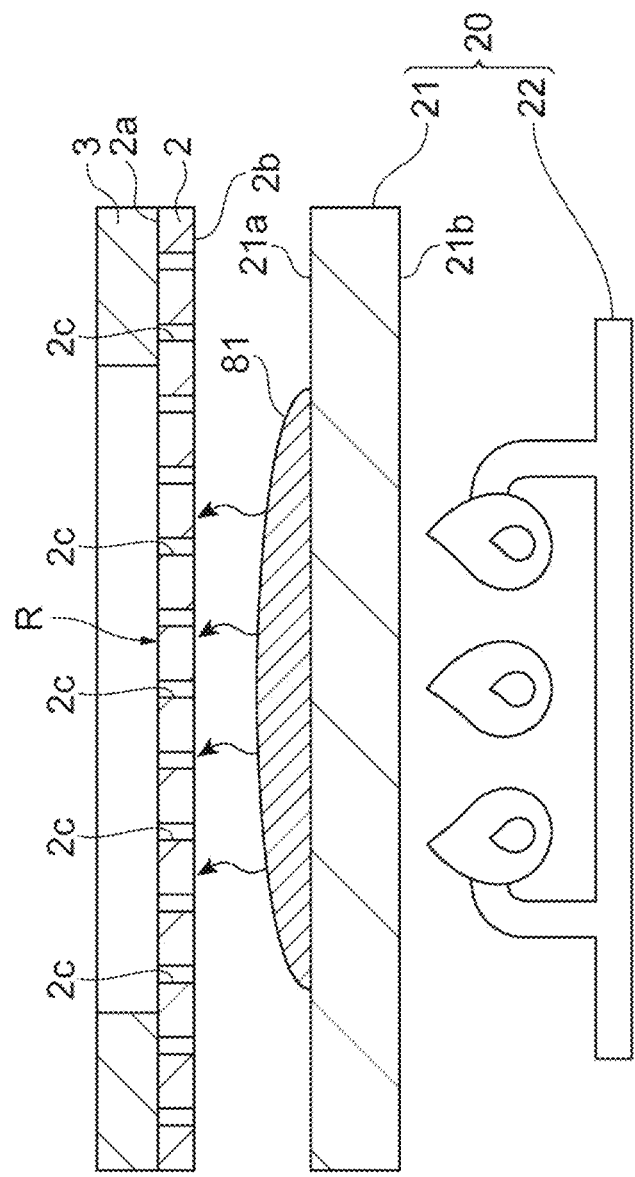
FIG. 9 is a diagram illustrating the steps of a modification example of the manufacturing method of the sample support body.

In addition, in the second step of the manufacturing method of the sample support body 1, the solvent 81 may be introduced into the plurality of through holes 2c in a state of being heated and evaporated. Specifically, as illustrated in FIG. 9, the solvent 81 is heated by a heating device 20. The heating device 20 includes a heating plate 21 and a heat source 22. The material of the heating plate 21, for example, is a metal having excellent heat conductivity. The heating plate 21 includes a mounting surface 21a and a heating surface 21b. The heat source 22, for example, is a burner.

First, the solvent 81 is prepared, and is mounted on the mounting surface 21a of the heating plate 21. Subsequently, the heating surface 21b of the heating plate 21 is heated by the heat source 22. The heat of the heat source 22 is transmitted to the solvent 81 via the heating plate 21. The solvent 81, for example, is heated to approximately 300° C. and is evaporated. Subsequently, the substrate 2 on which the conductive layer 4 is provided is disposed such that the effective region R is positioned above the solvent 81, in a state of being fixed to the frame 3. Accordingly, the evaporated solvent 81 is introduced into the plurality of through holes 2c. The solvent 81 that is introduced into the plurality of through holes 2c in the evaporated state is cooled at a normal temperature, and thus, fills each of the through holes 2c, and is in contact with the substrate 2, and therefore, is remained in each of the through holes 2c. Even in such a case, it is possible to easily introduce the solvent 81 into each of the through holes 2c.

In addition, in the third step of the laser desorption/ionization method and the mass spectrometry method described above, the voltage may be applied to the conductive layer 4 without using the mounting surface 6a of the glass slide 6 and the tape 7. In this case, the glass slide 6 and the tape 7 may not have conductivity.

In addition, in the mass spectrometry device 10, the region corresponding to the effective region R may be irradiated with the laser beam L by the laser beam irradiation unit 13 at one time, and the sample ion Si may be detected by the ion detection unit 15 while two-dimensional information of the region is maintained. That is, the mass spectrometry device 10 may be a projection mass spectrometry device.

In addition, the laser desorption/ionization method described above can be used not only in imaging mass spectrometry in which the two-dimensional distribution of the molecules configuring the sample S is imaged, but also in other measurements and tests such as the measurement of the mass spectrum of the sample S or ion mobility measurement.

In addition, an example has been described in which the opening 3a of the frame 3 is in the shape of a circle when seen from the thickness direction of the substrate 2, but the opening 3a may have various shapes. The opening 3a of the frame 3, for example, may be in the shape of a rectangle.

In addition, an example has been described in which the sample S is mounted on the glass slide 6, but the sample S may be directly mounted on the support portion 12 of the mass spectrometry device 10. At this time, the support portion 12 of the mass spectrometry device 10 corresponds to the glass slide 6.

In addition, the application of the sample support body 1 is not limited to the ionization of the sample S by the irradiation of the laser beam L. The sample support body 1 may be used in the ionization of the sample S by the irradiation of energy beam(for example, an ion beam, an electron beam, and the like) other than the laser beam L.

REFERENCE SIGNS LIST

1: sample support body, 2: substrate, 2a: first surface, 2b: second surface, 2c: through hole, 4: conductive layer, 6: glass slide (mounting portion), 6a: mounting surface, 81: solvent, L: laser beam, S: sample.

The invention claimed is:

1. A laser desorption/ionization method, comprising:
a first step of preparing a sample support body including a substrate on which a plurality of through holes opening to a first surface and a second surface facing each other are formed, a conductive layer provided on at least the first surface, and a solvent provided in the plurality of through holes with refractoriness in a vacuum;
a second step of mounting a sample on a mounting surface of a mounting portion, and of disposing the sample support body on the sample such that the second surface is in contact with the sample; and
a third step of ionizing a component of the sample that is mixed with the solvent and is moved to the first surface side from the second surface side through the through hole by irradiating the first surface with laser beam while applying a voltage to the conductive layer, in a state in which the sample is disposed between the mounting portion and the sample support body.

2. The laser desorption/ionization method according to claim 1,
wherein the sample is a dry sample.

3. The laser desorption/ionization method according to claim 1,
wherein the solvent is at least one selected from glycerin, diethanol amine, triethanol amine, nitrobenzyl alcohol, nitrophenyl octyl ether, thioglycerol, diethylene glycol, triethylene glycol, tetraethylene glycol, liquid paraffin, sulfolane, dithiothreitol, a mixture of dithiothreitol and thioglycerol, a mixture of dithiothreitol and nitrobenzyl alcohol, and a mixture of dithiothreitol and dithioerythritol.

4. A mass spectrometry method, comprising:
each of the steps of the laser desorption/ionization method according to claim 1; and
a fourth step of detecting the component that is ionized in the third step.

5. A laser desorption/ionization method, comprising:
a first step of preparing a sample support body including a substrate having conductivity on which a plurality of through holes opening to a first surface and a second surface facing each other are formed, and a solvent provided in the plurality of through holes with refractoriness in a vacuum;
a second step of mounting a sample on a mounting surface of a mounting portion, and of disposing the sample support body on the sample such that the second surface is in contact with the sample; and
a third step of ionizing a component of the sample that is mixed with the solvent and is moved to the first surface side from the second surface side through the through hole by irradiating the first surface with laser beam while applying a voltage to the substrate, in a state in which the sample is disposed between the mounting portion and the sample support body.

6. The laser desorption/ionization method according to claim 5,
wherein the sample is a dry sample.

7. The laser desorption/ionization method according to claim 5,
wherein the solvent is at least one selected from glycerin, diethanol amine, triethanol amine, nitrobenzyl alcohol, nitrophenyl octyl ether, thioglycerol, diethylene glycol, triethylene glycol, tetraethylene glycol, liquid paraffin, sulfolane, dithiothreitol, a mixture of dithiothreitol and thioglycerol, a mixture of dithiothreitol and nitrobenzyl alcohol, and a mixture of dithiothreitol and dithioerythritol.

8. A mass spectrometry method, comprising:
each of the steps of the laser desorption/ionization method according to claim 5; and
a fourth step of detecting the component that is ionized in the third step.

* * * * *